United States Patent
Buesing et al.

(10) Patent No.: US 6,884,193 B2
(45) Date of Patent: Apr. 26, 2005

(54) TENSIONING DEVICE AND TRANSPOSITIONING DEVICE WITH THE TENSIONING DEVICE

(75) Inventors: Boris Buesing, Stuttgart (DE); Thomas Schmid, Ludwigsburg (DE); Ernst Leisner, Ludwigsburg (DE)

(73) Assignee: Bosch Rexroth AG, Stuttgart (DE)

( * ) Notice: Subject to any disclaimer, the term of this patent is extended or adjusted under 35 U.S.C. 154(b) by 160 days.

(21) Appl. No.: 10/308,444

(22) Filed: Dec. 3, 2002

(65) Prior Publication Data

US 2003/0109341 A1 Jun. 12, 2003

(30) Foreign Application Priority Data

Dec. 6, 2001 (DE) .......................................... 101 59 838

(51) Int. Cl.⁷ ................................................ F16H 7/10
(52) U.S. Cl. ...................................... 474/123; 474/101
(58) Field of Search .................. 901/19, 21; 198/468.6, 198/817; 474/101, 115, 117, 122, 123; 74/490.04, 89.2, 89.21, 89.22

(56) References Cited

U.S. PATENT DOCUMENTS

| | | | |
|---|---|---|---|
| 3,067,851 A | | 12/1962 | O'Rourke |
| 3,494,210 A | | 2/1970 | Ashton et al. |
| 4,648,774 A | * | 3/1987 | Dorumsgaard et al. 414/416.01 |
| 4,812,104 A | * | 3/1989 | Suzuki ........................ 414/735 |
| 4,837,919 A | * | 6/1989 | Hoppe .......................... 483/38 |
| RE34,311 E | * | 7/1993 | Millis et al. ................. 414/217 |
| 6,354,167 B1 | * | 3/2002 | Snow ....................... 74/490.01 |

FOREIGN PATENT DOCUMENTS

| | | |
|---|---|---|
| DE | 131 278 | 6/1978 |
| DE | 30 12 355 A | 10/1981 |
| DE | 41 24 763 A | 1/1993 |
| DE | 44 39 106 C | 5/1996 |
| DE | 196 03 554 A | 8/1997 |

OTHER PUBLICATIONS

"Precision Engineering" A Manual and Texbook for Precision Engineering, Electrical Engineers, Toolmakers and Related Trades, Published by Paul Schlichting, Engineer, Hamburg, Heinrich Kilinger Verlagsgesellschaft MBH, Nordhausen, 1929, pp. 655–656.
"Hub–Quereinheit HQ 2/S Lift Transverse Unit", HQ 2/S Bosch, Nov. 11, 2002, pp. 4–4 and 4–5.
"Hub–Quereinheit HQ 1/O Lift Transverse Unit", TS 1 Bosch, Nov. 11, 2002, pp. 4–2 and 4–3.

* cited by examiner

*Primary Examiner*—David A. Bucci
*Assistant Examiner*—Vicky A. Johnson
(74) *Attorney, Agent, or Firm*—Michael J. Striker

(57) ABSTRACT

A tensioning device (32) for tensioning at least two, substantially length-invariant belts (18, 24) includes a first belt (18) guided about a first axis (A), which repeatedly guides an adjusting movement in an adjustment direction substantially orthogonal to the axial direction of the first axis (A). In addition, the first belt (18) and a second belt (24) are guided about a common second axis (B), whereby the tensioning directions ($V_{18}$, $V_{24}$) of the first belt (18) and of the second belt (24) in a region of the second axis (B) forms a varying angle of between 0° and 180°. The second axis (B) is associated with a spring unit (40), which prestresses in the sense of the tensioning of the first belt (18) and the second belt (24) and which, upon an adjusting movement of the first axis (A), permits a compensating movement of the second axis (B) from the plane covered by the axial direction of the second axis (B) with the tensioning directions ($V_{18}$, $V_{24}$) of the first belt (18) and of the second belt (24), respectively, before initiating of the adjusting movement.

13 Claims, 3 Drawing Sheets

TENSIONING DEVICE AND TRANSPOSITIONING DEVICE WITH THE TENSIONING DEVICE

BACKGROUND OF THE INVENTION

The present invention relates to a device for tensioning at least two essentially length-invariant belts, whereby a first belt is guided around a first axis, which repeatedly performs an adjustment movement in an adjustment direction that runs orthogonally to the axial direction of the first axis, and whereby the first belt and a second belt are guided about a common second axis, whereby the tensioning directions of the first belt and of the second belt, in the region of the second axis, form a varying angle of between 0° and 180°.

In connection with the present invention, when the teaching "essentially length-invariant belts" is used, what is meant is that the belts practically cannot be reacted by means of a change in length from an outer force acting on them, as is the case, for example, with common polyurethane belts. Of course, it is clear, however, that this type of length-invariant, or rigid material, has a known elasticity. This insignificant elasticity, however, does not contradict the fact that in the frame of the present invention, the belts are essentially length-invariant.

In addition, when the teaching is that a belt is "guided around an axis", it should also be understand that the belt is guided about a belt pulley, or a pinion, which is rotatably attached on a rigid axis, or rigidly attached on a rotatably shaft. It is also contemplated, however, that the belt is guided about a plurality of correlated axes, for example, based on common movement.

Finally, regarding the tensioning directions of the first and second belts, it is to be understood that what is meant is the positive direction of the respective tensioning forces which these belts exert on the second axis.

These types of lifting-transverse units, as are disclosed, for example, in DE 30 12 355 A1 and DE 196 03 554 A1, serve in a conveyance system for work pieces, or work piece carriers, to stop work pieces, or work piece carriers, transported on a first conveying track, to lift the work pieces or work piece carriers from the conveyor means of the first conveyor track, and to transfer the work pieces or work piece carriers to a second conveyor track that is mostly orthogonal to the first conveyor track. The lifting-transverse unit includes a lifting unit with integrated lift apparatus, for example, a pneumatic cylinder, and one or more guide rods. With a positioning element of the force apparatus, for example, the piston rod of the pneumatic cylinder, and the guide rods, a lifting plate is rigidly connected, on which a plurality of axes for supporting guide pulleys for tensioning belts are provided. These axes together form "a first axis" in the sense of the present invention. By means of the tensioning belts, the work piece, or the work piece carrier, is transported after lifting from the first conveyor track to the second conveyor track. For driving the tensioning belts, these are guided about a further axis, about which also a drive belt is guided, which, in turn, is driven by a geared motor or the like.

With the lifting-transverse unit HQ2/S, also the lifting movement is made with the common axis of the tensioning belts and drive belts, so that as a result, this lifting movement indeed does not change the tensioning or stretching of the tensioning belts, rather the tensioning of the drive belts. Therefore, a tensioning device in the form of tension rollers are provided, which, upon the assembly of the entire device, are adjusted. The change in length on the belts is therefore not equalized; that is, the tensioning is different depending on the stroke adjustment. Upon use of an addition, spring-loaded tension roller, the belt tension can be held constant.

In addition, a further lifting-transverse unit of Bosch GmbH is known, namely, the lifting-transverse unit HQ1/O. With this unit, the drive belt is formed from a loop of polyurethane so that it can reacted to the lifting movement as well as the manufacturing and assembly tolerances by means of an elastic elongation or extension, that is, by means of a change in length.

SUMMARY OF THE INVENTION

In contrast, the problem addressed by the present invention is to provide a tensioning device, in particular, for a device for transposition of work pieces, or work piece carriers, which, despite fixed assembly of a drive motor of the belts also with the use of essentially length-invariant belts, makes possible that the tensioning of the belt, also in tensioning of the adjustment movement of the first belt, is essentially not changed.

This problem is resolved according to the present invention by a tensioning device of initially described type, in which the second axis is associated with a spring unit, which biases in the sense of the tensioning of the first belt and the second belt and which, upon an adjustment movement of the second axis, permits a compensating movement of the second axis from the plane extending through the axial direction of the second axis with the tensioning directions of the first belt and the second belt, respectively, before beginning of the positioning or adjusting movement. By means of the inventive compensation movement, the distance of the first axis from the second axis as well as the distance of the second axis from the drive axis of the second belt can be maintained essentially constant. In consideration of the length-invariance of the belts, this leads to the result that the tensioning of the belts can be maintained essentially constant. Then, only when the displacement of the second axis brings up a change of the tensioning force of the spring unit, also an insignificant change of the tensioning of the belt is provided. The change of the tensioning force of the spring unit, for example, can be minimally maintained by means of the use of a biased spiral spring, be it a compression spring or a spiral tension spring, or a gas spring with comparatively thinner piston rods, with reference to the entire diameter of the piston.

A further advantage of the invention is to be seen in the simplification of the construction of the tensioning device, and thus, the entire transposition device, thereby achieving that the use of an additional tension roller can be eliminated.

In a further embodiment of the invention, it is proposed that the first axis (or the plurality of first axes) is supported on an adjustable belt relative to a base unit, and that the second axis (or the plurality of second axes) is supported on a holder, which is guided displaceably on the belt relative to this, whereby the spring unit is braced on one end on the belt and on the other end on the holder. This makes possible a particularly compact and space-saving construction not only of the tensioning device, rather the entire transpositioning unit. Basically, however, it is also possible to guidably support the support on the drive axis of the second belt, or the housing of the drive motor for the second belt or alternatively, on the base unit.

For a simple and cost-effective construction, it can be provided that a base plate of the tensioning device and/or the support that is attachable, or attached, to the belt is made from a sheet, preferably a metal sheet. In particular, the base plate and/or the support can be formed as a punched or cut (for example, by means of a laser) and, as desired, bent sheet part.

For facilitating of changing out of the first and second belts, it can be provided that at least one bearing of the second axis is formed as recess open on one side. In normal operation, therefore, the dropping out of the second axis from this bearing by means of the tensioning of the first belt and/or by means of the tensioning of the second belt can be prevented, and this is done in a simple manner by corresponding orientation of the open side of the recess. In particular, at least one of the areas of contact of the recess are oriented such that, in consideration of the positive direction of the tensioning force of the respectively observed belt (i.e., the tensioning direction of the belt), it operates as a directional projection for the second axis in the recess.

For realizing the guiding of the second axis relative to the frame, at least one ribbed guide can be provided on either the base plate or holder, and on a respective other part, support or base plate, and coordinated guide recess can be provided. In particular, with the sheet metal manufacture of the base plate and/or holder, the at least one ribbed guide can be made by bending of a sheet bar. Already in the simplest case, in which the compensating movement of the second axis exists in a pivoting movement about the drive axis of the second belt, this compensating movement cannot be realizable by means of a simple, linear guide, without the danger of a canting or other type of blocking of the support on the base plate. For simplification of the form of the guide means, ribbed guides and guide recess, it is therefore proposed that the ribbed guide runs substantially orthogonally to the tensioning direction of the second belt before beginning of the adjusting movement, and that the guide recess is measured with reference to the dimension size of ribbed guide therein that the support is pivotable about an axis running substantially parallel to the second axis.

The belts preferably can have an insert made from a tension-proof material for achieving of the length-invariance, for example, an insert made from tension-proof glass fiber material, tension-proof plastic fibers, or metal, in particular, steel wires. Not only, however, can these materials improve the length-invariant construction, but also the construction of the belts as toothed belts can improve the durability of the belts as well as the precision of the movement of the first belt.

For facilitating assembly and/or disassembly of the first and second belts, the tensioning device is proposed as a whole, however also the base plate and/or the support can be individual parts of the tensioning device. It is also contemplated that on the base plate and/or the holder, a supporting spindle for holding the spiral spring is provided and/or that on the base plate and/or the holder, at least one stop for limiting the relative movement between the base plate and support is provided.

In order to provide that the tensioning force of all belts is substantially the same size, it is proposed in another embodiment that the point of impact of the spring unit on the support relative to the position of the second axis is selected in consideration of the tensioning directions of the first belt and the second belt and corresponding to the number of first belts and the number of second belts. After assembly of the tensioning device as well as the belt, a stationary state is utilized, in which the tensioning of the first belt exerts a moment of rotation, which is oppositely directed relative to the moment of rotation exerted on the support from the tensioning of the second belt, but which is of the same total size as the moment of rotation exerted on the support from the tensioning of the second belt. Should all of the belt be operated with essentially the same tensioning force, then the lever arm of the conversion of the tensioning force of all belts of one observed type (first belts or second belts) originating from a situation with only a single one of such belts must be selected to be inversely proportional to the number of belts of this type. With a tensioning device for two first belts and one second belt, the lever arm of the first belts, then, must be selected to be half as big as the lever arm of the second belt.

According to a further point of view, the present invention relates further to a device for transpositioning work pieces or work piece carriers with a tensioning device according to the present invention.

DETAILED DESCRIPTION OF THE PREFERRED EMBODIMENTS

Figure 1:
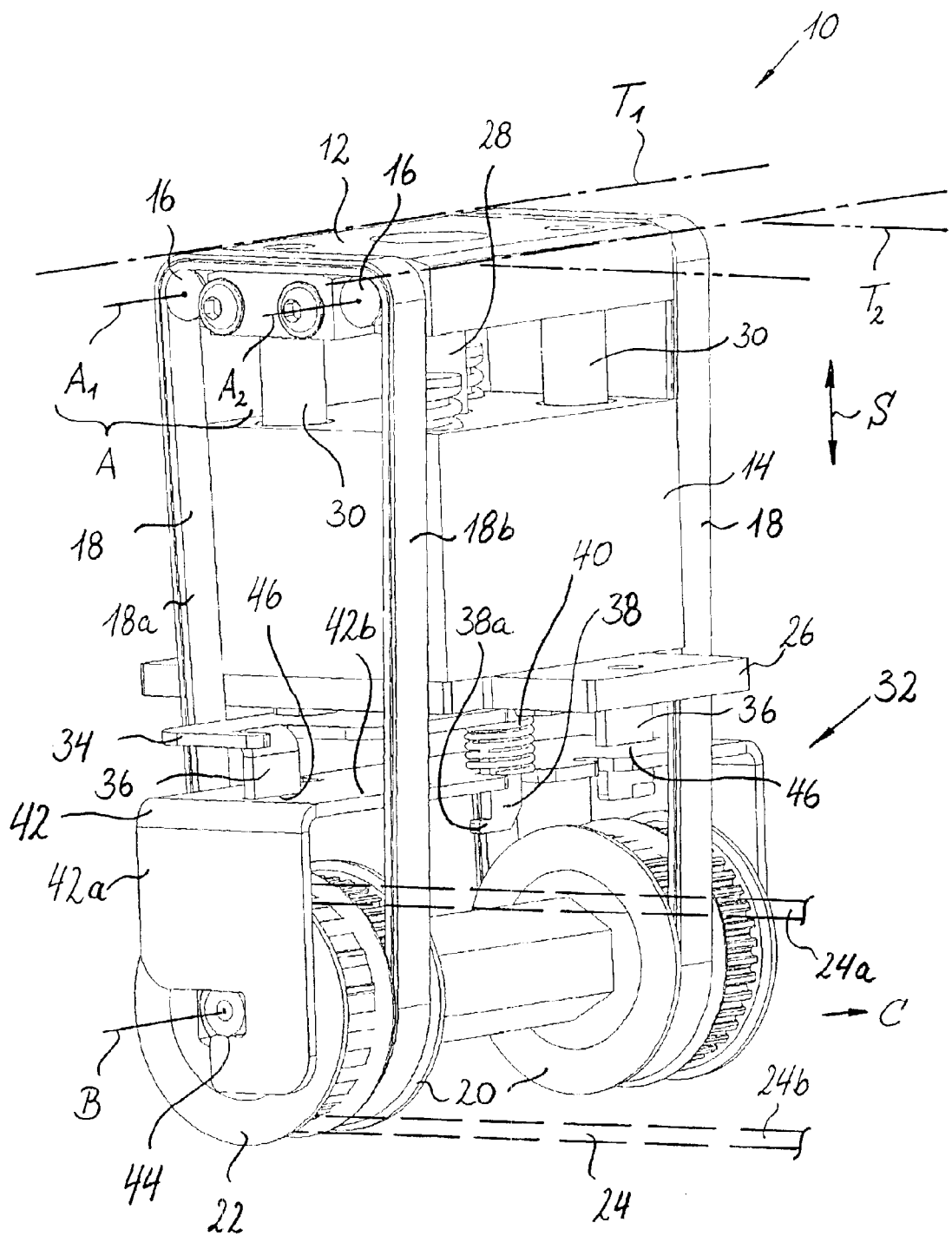
FIG. 1 is a perspective view of a positioning device that is equipped with a tensioning device according to the present invention.

In FIG. 1, the inventive transpositioning device, in whole, is designated with reference numeral 10. These types of transpositioning devices are known in the state of the art, and therefore, will not be described here in great detail. The transpositioning device 10 serves for transferring or transpositioning work pieces, or work piece carriers, from a first conveyor track $T_1$ onto a second conveyor track $T_2$. The transport belts of the first conveyor belt $T_1$ are shown in FIG. 1 in dash-dot representation and those of the second conveyor track $T_2$ are indicated in dot-dash lines as well.

The transpositioning device 10 includes a lifting plate 12, which, by means of a lifting device 14, for example, a pneumatic cylinder, can be shifted, in particular, lifted and lowered. In this manner, the work pieces or work piece carriers can be brought out of contact with the transport bands of the first conveyor track $T_1$. On the lifting plate 12, guide rollers 16 are rotatably mounted about axes $A_1$ and $A_2$, whereby the axial directions of these axes $A_1$ and $A_2$ run substantially parallel to the direction of course of the transport bands of the first conveyor track $T_1$. Adjustment belts 18 are lead about these guide rollers 16, which, after the lifting of the work pieces or the work piece carriers from the first conveyor track $T_1$, are drive, in order to move the work piece or work piece carrier transverse to the direction of course of the transport bands of the first conveyor track $T_1$, and thereby bringing them into contact with the transport bands of the second conveyor track $T_2$. The axes $A_1$ and $A_2$ form together a first axis A in the sense of the present invention.

For driving the adjusting belts 18, these belts are guided about pinions, which are rotatably supported on an Axis B, or which are non-rotatably connected with a rotatably shaft B. On this axis or shaft B, a further pinion 22 is arranged, about which a drive belt 24 is guided. The drive belt 24 can be driven by means of a drive unit, for example, a geared motor, not shown in FIG. 1. The geared motor can be activated or deactivated by a control unit, which receives corresponding sensor signals from suitable sensors regarding the position of the work pieces or work piece carriers, and process these signals according to a provided algorithm.

Figure 3:
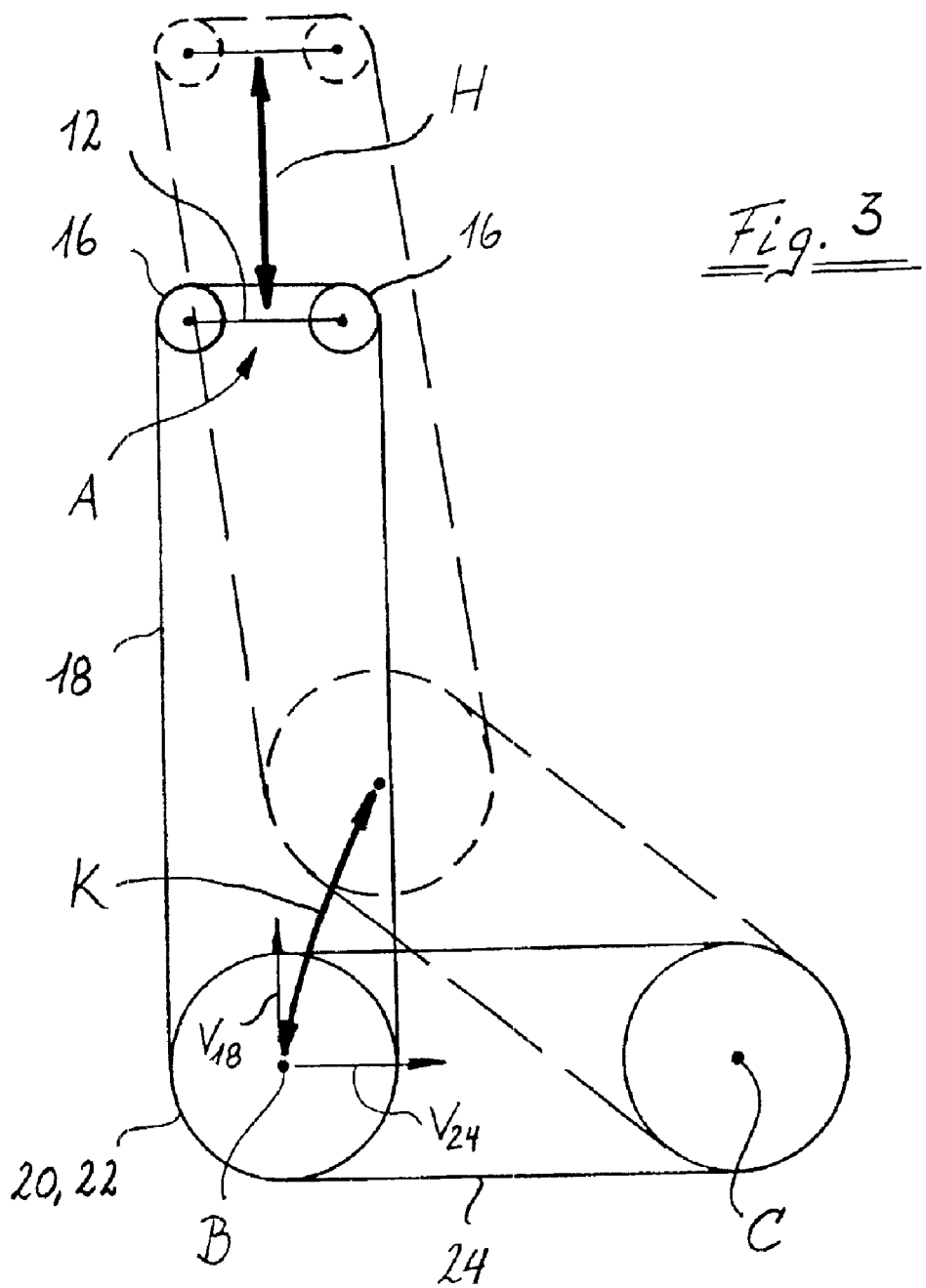
FIG. 3 is a schematic illustration of the running of the first and second belts for explanation of the basic functioning principles of the inventive tensioning device.

Since, according to FIG. 1, the back and forth running strands 18a and 18b of the adjusting belt 18, or 24a and 24b of the drive belt 24, run substantially parallel to one another, their course of direction corresponds generally also to the positive direction of the respective tensioning force of the belt 18 or 24 (i.e., the tensioning direction $V_{18}$ or $V_{24}$; see FIG. 3).

It should be noted that the adjusting belt 18 and the drive belt 24 preferably are formed as toothed belts with glass fiber inserts. In this manner, the desired precision of control of the movement of the adjusting belt 18 can be achieved. In addition, the belts, essentially length-invariant, belts, have a high durability.

In addition, the lifting device 14 is fixedly connected via a base plate 26 with a higher assembly (not shown in FIG. 1). Further, one recognized in FIG. 1 the adjusting element 28 of a force apparatus of the lifting device 14, as well as two guide rods 30, which serve to guide the lifting plate 12 in the adjusting direction S.

The common axis B to the belts 18 and 24 is supported in a tensioning device 32, whose construction and function will be explained in detail below:

The tensioning device 32 includes a base plate 34, which is connected with the lifting plate 12 via the guide rods 30. The base plate 34 is manufactured as a stamped or cut (for example, by means of a laser) and bent metal sheet part. In particular, the base plate 34 includes three clips, which are bent out of the plane of the sheet according to the orientation shown in FIG. 1, specifically two ribbed guides 36 and a holding bar 38 for a compression spring 40. In addition, the tensioning device 32 includes a support 42, in which the axis B is supported. The support 42 is likewise manufactured as a stamped or cut and bent sheet part. In particular both the transverse ends 42 having the bearing recesses 44 for the axis B are bent downwardly from the plane of the sheet, according to the orientation shown in FIG. 1. In the base bar 42b of the support 42, two guide recess 46 are formed, which are traveled over by the ribbed guides 36 of the base plate 34. The compression spring 40 braces on one end on the base plate 34 and on the other end on the support 42, and thereby tensions the adjusting belt 18 as well as the drive belt 24, as will be described below in greater detail. The relative movement of the base plate 34 and the support 42 are limited by means of a stop 38a.

Figure 2:
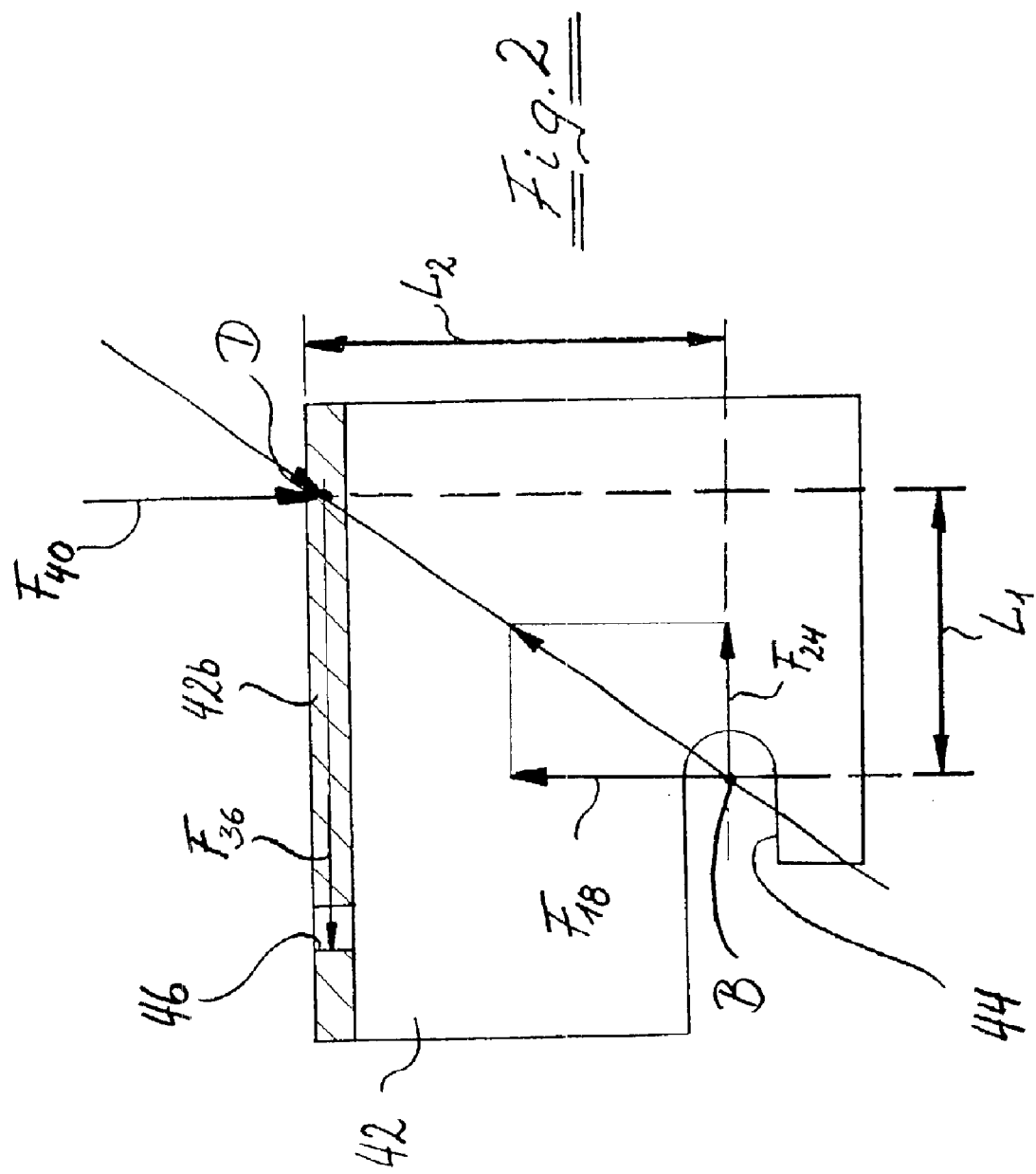
FIG. 2 is a schematic side view of the support of the inventive tensioning device for explanation of the force acting on this holder.

For explanation of the force acting on the support 42, reference will now be made to the schematic side view of the support 42 illustrated in FIG. 2.

As previously noted, the spring 40 impels the support 42 downwardly with a force $F_{42}$. As a result of this force $F_{42}$, the adjusting belts 18 are tensioned, which produced the counter force $F_{18}$ acting on the axis B. The force $F_{18}$ leads to a moment of rotation $M_1$ and the pivoting axis D ($M_1 = F_{18} \times L_1$). This moment of rotation $M_1$ is compensated in the stationary state by a corresponding counter moment $M_2$, which originates from the tensioning force $F_{24}$ of the drive belts 24 ($M_2 = F_{24} \times L_2$). The corresponding counter force is exercised on the support 42 by means of the ribbed guides 36 of the guide plate 34. One can easily see in this connection that it does not depend on the accurate position of the ribbed guides 36 or the guide recesses 46 in the plane of the base leg 42b of the support.

The embodiment shown in FIG. 1 has two adjusting belts 18 and a drive belt 24. In order to also enable in this case a varying number of adjusting belts 18 and drive belts 24, in which all of the belts 18 and 24 are tensioned with substantially the same force, the lengths $L_1$ and $L_2$ of the lever arms of the tensioning forces $F_{18}$ and $F_{24}$ and the number of the respective belt type should be inversely proportional to one another. With a tensioning device 32 for two adjusting belts 18 and one drive belt, as illustrated in FIG. 1, the length $L_1$ of the lever arm of the adjusting belt 18 should be selected, then, to be half as large as the length $L_2$ of the lever arm of the drive belt 24. It should be noted that this ratio is not realized in the illustration according to FIG. 2.

In addition, the bearing recess 44, in which the axis B is supported, is formed to be open on one side. Nevertheless, the axis B is securely held in this bearing recess 44, since neither the tensioning force $F_{18}$ of the adjusting belt 18 nor the tensioning force $F_{24}$ of the drive belt 24 has a component outside of this recess 44. In the embodiment shown in the figures, the adjusting belts 18 and the drive belts 24 run substantially orthogonally to one another.

If the transpositioning device 10 is to be operated, in order to lift up a work piece or a work piece carrier from the conveyor bands of the conveyor track $T_1$, that is, the lifting device 14 is extended in order to lift the lifting plate 12, also the axis B is lifted, based on the length-invariance of the adjusting belt 18. Since the drive axis C of the drive belt 24 is fixedly arranged, and also the drive belt 24 l formed to be substantially length-invariant, the axis B guides a circular movement K about the drive axis C, in the simplest case, sketched in FIG. 3, upon lifting of the lifting plate 12.

About the axis B, also in practice, this movement makes it possible first to take up the entire tensioning device 32, or more accurately, its base plate 34, via the guide rods from the lifting plate 12. In addition, the ribbed guides 36 and the guide recesses 35 make possible a linear compensating movement in the adjusting direction S. Finally, the guide recesses 46 in comparison with the cross section of the ribbed guides 36 are dimensioned or oversized such that the support 42 can not only move linearly upwardly or downwardly along the ribbed guides 36, but also can pivot about the axis D, without the danger of canting or blocking of the ribbed guides 35 in the guide recesses 46. Essential to this pivoting movement is that it has a component that runs orthogonally to the adjusting direction S. The linear and pivoting compensating movement leads to a change of the tensioning of the spring 40.

The circular movement K, then, is approximated through a superimposition of a linear drag movement (in adjusting direction S), as well as a linear (in adjusting direction S) and a pivoting (about the axis D) compensating movement. In this manner, the length of the belts 18 and 24 do not need to be changed upon the lifting movement H of the lifting plate 12. Merely the tensioning of the belts 18 and 24 changes in the amount in which also the spring force of the spring 40 varies. This spring force change, however, is based on the fact that it is generated only from the compensating movement, not, however, from the entire movement of the base plate 34 of the tensioning device 32, and can be minimized further to this purpose by use of a biased spring without further.

It will be understood that each of the elements described above, or two or more together, may also find a useful application in other types of constructions differing from the types described above.

While the invention has been illustrated and described herein as a tensioning device and transpositioning device with the tensioning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device (32) for tensioning at least two length-invariant belts (18, 24), comprising:
   a first belt (18), wherein the first belt (18) is guided about a first axis (A), which repeatedly performs an adjusting movement in an adjustment direction (S) that is substantially orthogonal to an axial direction of the first axis (A); and
   a second belt (24), wherein the first belt (18) and the second belt (24) are guided about a common second axis (B), wherein tensioning directions ($V_{18}$, $V_{24}$) of the first belt (18) and of the second belt (24) in a region of the second axis (B) form a varying angle of between 0° and 180°, wherein the second axis (B) is associated with a spring unit (40), wherein the spring unit tensions the first belt (18) and the second belt (24) and wherein the spring unit (40), upon an adjusting movement of the first axis (A), permits a compensating movement of the second axis (B) from a plane covered by an axial direction of the second axis (B) with the tensioning direction ($V_{18}$, $V_{24}$) of the first belt (18) and of the second belt (24), respectively, before initiation of the adjusting movement.

2. The tensioning device accordIng to claim 1, wherein the first axis (A) is supported on a frame (12/30) that is displaceable relative to a base unit (26), and wherein the second axis (B) is supported on a support (42), wherein the support (42) is guided displaceably on the frame (12/30) relative to said frame (12/30), wherein the spring unit (40) on a first end is braced directly or indirectly on the frame (12/30) and on a second end is braced directly or indirectly on the support (42).

3. The tensioning device according to claim 2, wherein on one part, either the base plate or a holder, at least one ribbed guide (36) is provided and on the other part, either the support or the base plate, a respectively associated guide recess (46) is provided.

4. The tensioning device according to claim 2, wherein a base plate (34) of the tensioning device and/or the support (42) attached on the frame (12/30) is made from sheet metal.

5. The tensioning device according to claim 1, wherein at least one bearing of the second axis (B) is formed as a recess (44) open on one side.

6. The tensioning device according to claim 3, wherein the ribbed guide (46) runs substantially orthogonally to the tensioning direction ($V_{24}$) of the second belt (24) before initiation of the adjusting movement, and wherein the guide recess (46) is dimensioned to be oversized with reference to a dimension size of the ribbed guide (36), such that the support (42) is pivotable about an axis (D) running substantially parallel to the second axis (B).

7. The tensioning device according to claim 1, wherein the belts (18, 24) have an insert made from a tension-proof material.

8. The tensioning device according to claim 1, wherein the belts (18, 24) are toothed belts.

9. The tensioning device according to claim 1, wherein the spring unit includes at least one element selected from the group consisting of at least one compression spring (40), at least one spiral tension spring, and at least one gas spring.

10. The tensioning device according to claim 1, wherein a holding spindle (38) for holding the spiral spring (40) is provided on the base plate (34) or on the support (42).

11. The tensioning device according to claim 1, wherein at least one stop (38a) for limiting relative movement between the base plate (34) and the support (42) is provided on the holding bar (38).

12. The tensioning device according to claim 1, wherein more than one first belt and more than one second belt is provided, wherein a position of impact of the spring unit (40) on the support (42) relative to a position of the second axis (B) is selected in consideration of the tensioning direction ($V_{18}$, $V_{24}$) of at least one of the first belts (18) and of at least one of the second belts (24) and in consideration of the number of first belts (18) and the number of second belts (24), wherein the tensioning force of all belts (18, 24) is essentially the same.

13. A device (10) for positioning work pieces or work piece carriers, including a tensioning device (32) as defined in claim 1.

* * * * *